US012656943B2

(12) United States Patent
Park et al.

(10) Patent No.: US 12,656,943 B2
(45) Date of Patent: Jun. 16, 2026

(54) SYSTEM FOR CREATING SOFTWARE PROGRAMS USING A GESTURE-BASED INTERFACE

(71) Applicant: Rabbit Three Times, LLC, New York, NY (US)

(72) Inventors: Joon Park, New York, NY (US); Daniel LaCivita, New York, NY (US); Michael Ferdman, New York, NY (US); Eric Eng, New York, NY (US)

(73) Assignee: P41N7 Capital LLC, Cupertino, CA (US)

( * ) Notice: Subject to any disclaimer, the term of this patent is extended or adjusted under 35 U.S.C. 154(b) by 356 days.

(21) Appl. No.: 16/678,677

(22) Filed: Nov. 8, 2019

(65) Prior Publication Data

US 2021/0141524 A1 May 13, 2021

(51) Int. Cl.
*G06F 3/04883* (2022.01)
*G06F 3/0482* (2013.01)
*G06F 3/04847* (2022.01)
*G06F 8/34* (2018.01)
*G06F 8/36* (2018.01)

(52) U.S. Cl.
CPC ........ *G06F 3/04883* (2013.01); *G06F 3/0482* (2013.01); *G06F 3/04847* (2013.01); *G06F 8/34* (2013.01); *G06F 8/36* (2013.01)

(58) Field of Classification Search
CPC ...... G06F 3/0482; G06F 8/34; G06F 3/04847; G06F 8/36
See application file for complete search history.

(56) References Cited

U.S. PATENT DOCUMENTS

| | | | | |
|---|---|---|---|---|
| 8,185,843 B2 * | 5/2012 | Bhatt | ................... | G06F 3/0482 715/802 |
| 8,438,498 B2 * | 5/2013 | Bhatt | ................... | G06F 3/0482 715/802 |
| 8,701,028 B2 * | 4/2014 | Kokemohr | .......... | G06F 3/04812 715/768 |
| 8,789,040 B1 * | 7/2014 | Callary | .................... | G06F 8/61 717/178 |
| 9,189,876 B2 * | 11/2015 | Ubillos | ................. | G06F 3/0482 |
| 9,424,799 B2 * | 8/2016 | Bhatt | ................. | G06F 3/04897 |
| 9,671,942 B2 * | 6/2017 | Fleury | ................ | G06F 3/04847 |
| 9,690,467 B2 * | 6/2017 | Kokemohr | .......... | G06F 3/04847 |

(Continued)

*Primary Examiner* — Kenny Nguyen

(57) ABSTRACT

A system for creating programs with gestures with a touch computer having a touch display, a plurality of actions preloaded on the touch computer for execution by the touch computer when triggered, a trigger received by the touch computer, software executing on the touch computer for associating the trigger with a corresponding one of the plurality of actions, text received by the software, text combinable with the triggers by the software into a program, a plurality of elements and operations components available to the touch computer for inclusion in the program, software executing on the touch computer for displaying a menu with a section for associating a gesture received by the touch display with a property of at least one element, wherein the gesture is a horizontal movement of the section relative to the touch display, a central computer in communication with the touch computer, and the central computer connected to the Internet to make the program available to authorized users.

14 Claims, 12 Drawing Sheets

(56) References Cited

U.S. PATENT DOCUMENTS

| | | | | |
|---|---|---|---|---|
| 10,282,055 B2 * | 5/2019 | Cherna | .................. | G06T 11/60 |
| 10,545,631 B2 * | 1/2020 | Ubillos | .............. | G06F 3/04847 |
| 2007/0294634 A1 * | 12/2007 | Kokemohr | .......... | G06F 3/04812 |
| | | | | 715/781 |
| 2008/0309677 A1 * | 12/2008 | Fleury | .................... | G06T 13/40 |
| | | | | 345/630 |
| 2009/0204913 A1 * | 8/2009 | Kawano | .............. | H04N 1/6011 |
| | | | | 715/762 |
| 2009/0235193 A1 * | 9/2009 | Bhatt | .................. | G06F 3/04847 |
| | | | | 715/765 |
| 2011/0087981 A1 * | 4/2011 | Jeong | .................. | G06F 3/04883 |
| | | | | 715/765 |
| 2011/0246943 A1 * | 10/2011 | Fujibayashi | .......... | G06F 3/0488 |
| | | | | 715/833 |
| 2012/0233569 A1 * | 9/2012 | Bhatt | .................... | G06F 3/0482 |
| | | | | 715/810 |
| 2012/0280922 A1 * | 11/2012 | Lee | .................... | G06F 3/04855 |
| | | | | 345/173 |
| 2013/0016123 A1 * | 1/2013 | Skarulis | .................. | G09G 5/00 |
| | | | | 345/633 |
| 2013/0106899 A1 * | 5/2013 | Bhatt | .................. | G06F 3/04897 |
| | | | | 345/593 |
| 2013/0235074 A1 * | 9/2013 | Cherna | .............. | G06F 3/04847 |
| | | | | 345/619 |
| 2013/0335455 A1 * | 12/2013 | Rooke | ..................... | G09G 5/34 |
| | | | | 345/684 |
| 2014/0104210 A1 * | 4/2014 | Kim | ...................... | G06F 3/0488 |
| | | | | 345/173 |
| 2014/0223376 A1 * | 8/2014 | Tarvainen | ............. | G06F 3/0486 |
| | | | | 715/833 |
| 2014/0250396 A1 * | 9/2014 | Kokemohr | .......... | G06F 3/04847 |
| | | | | 715/768 |
| 2015/0062046 A1 * | 3/2015 | Cho | ...................... | G06F 3/0412 |
| | | | | 345/173 |
| 2016/0026371 A1 * | 1/2016 | Lu | ....................... | G06F 3/04842 |
| | | | | 715/768 |
| 2017/0109136 A1 * | 4/2017 | Colle | ................... | G06F 3/0482 |
| 2017/0142339 A1 * | 5/2017 | Kim | ....................... | H04N 23/65 |
| 2017/0285929 A1 * | 10/2017 | Kokemohr | .......... | G06F 3/04847 |
| 2020/0042294 A1 * | 2/2020 | Elango | ............... | G06F 3/04817 |

* cited by examiner

Fig. 1     10
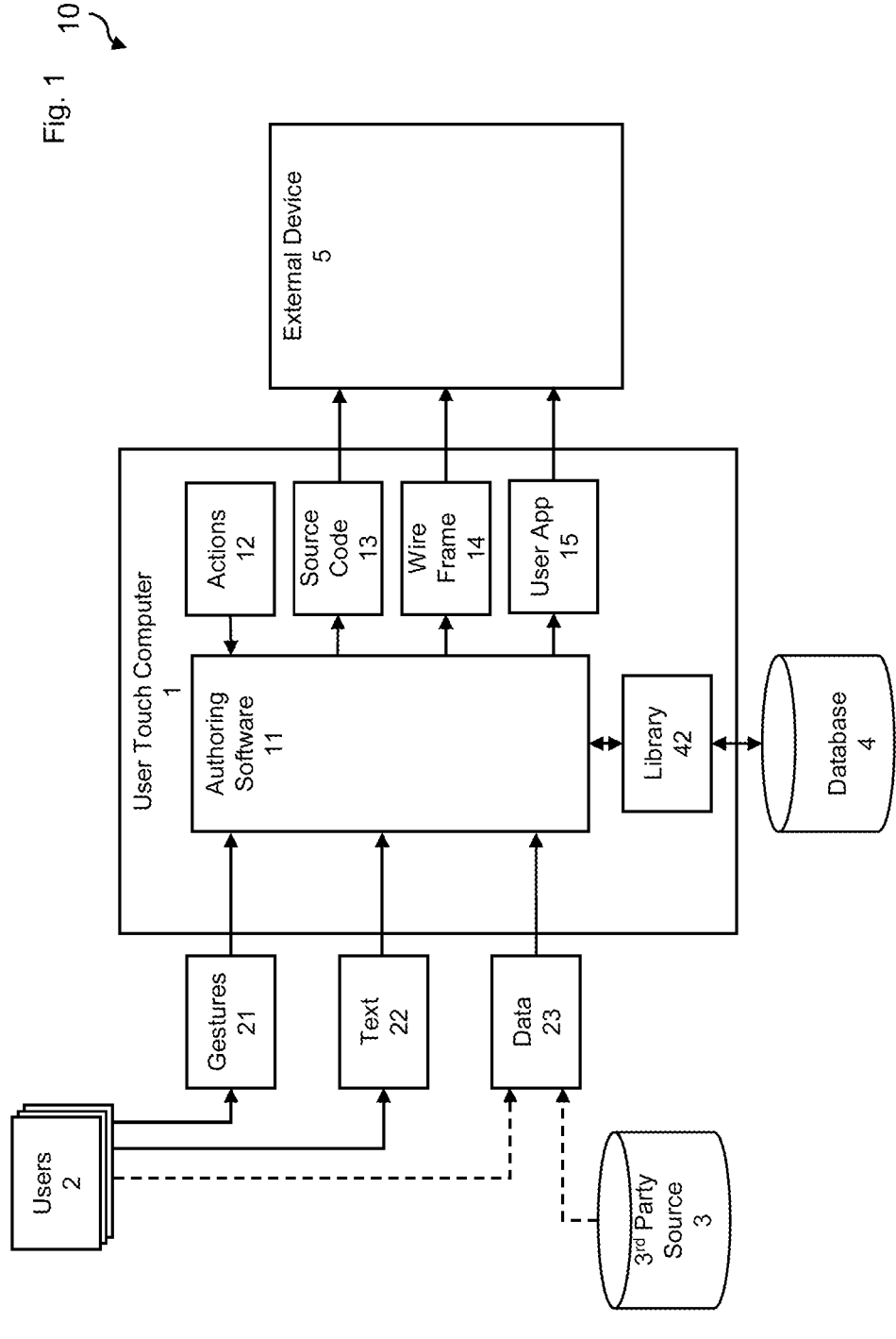

Fig. 2    10
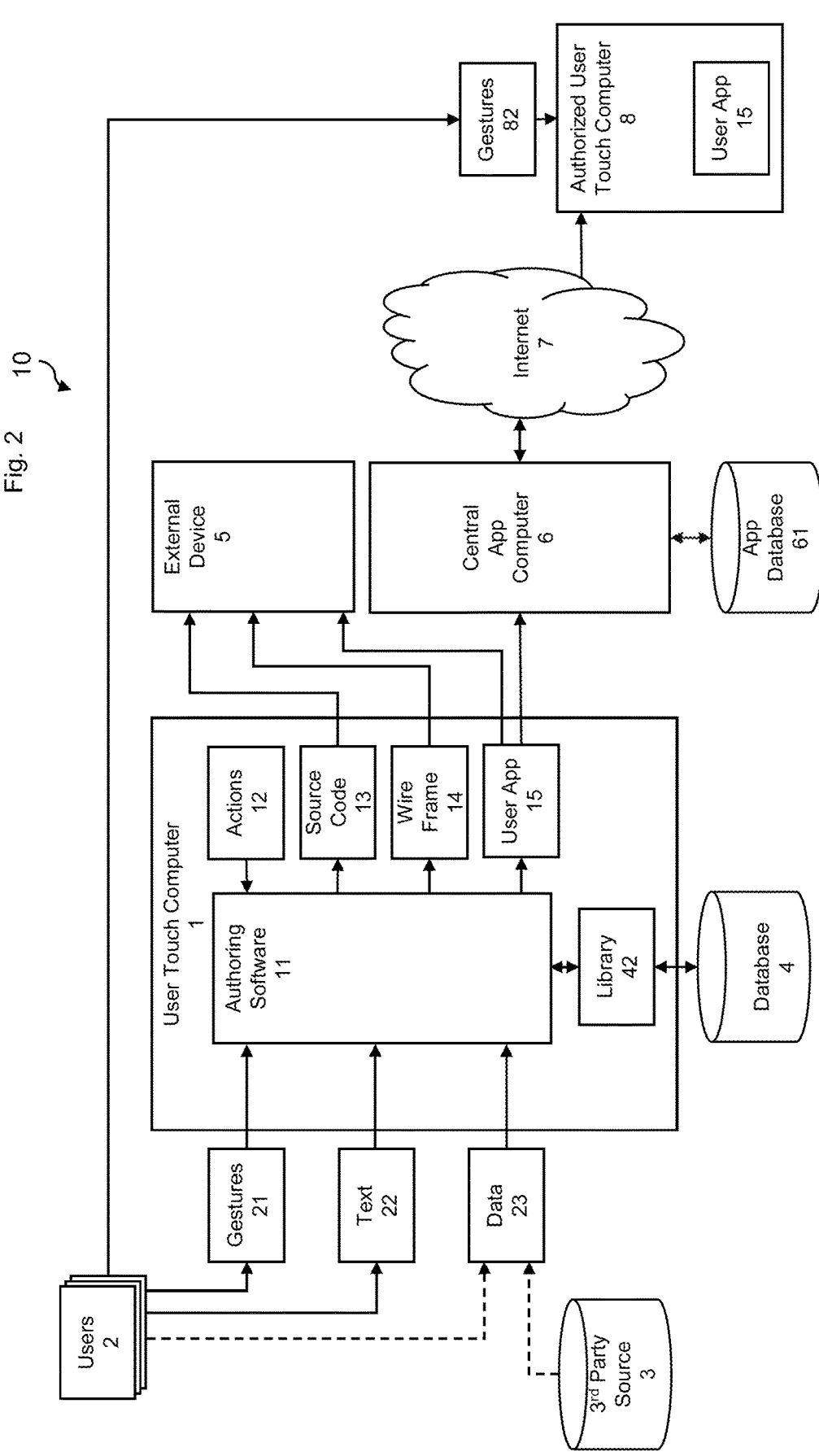

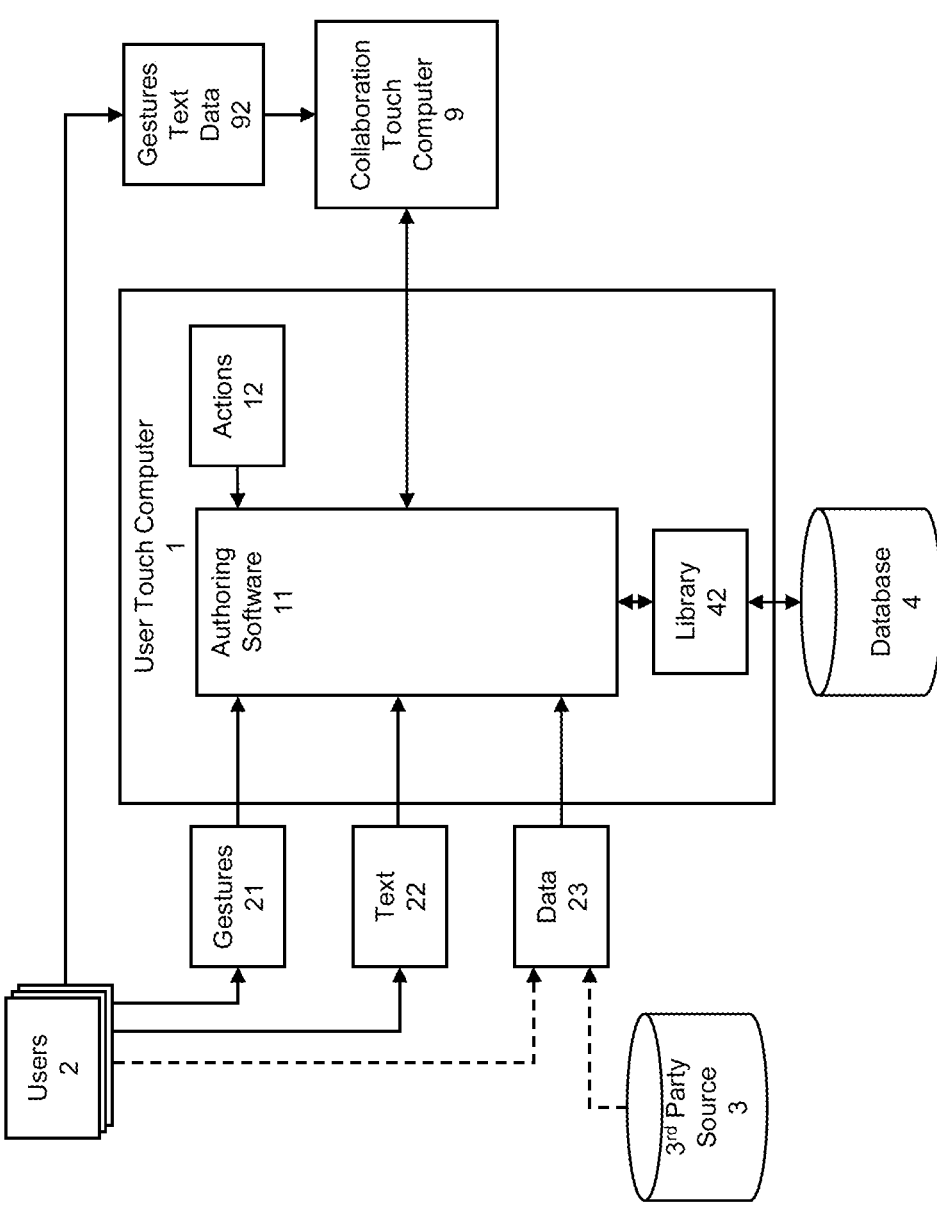
Fig. 3    10

Fig 4c
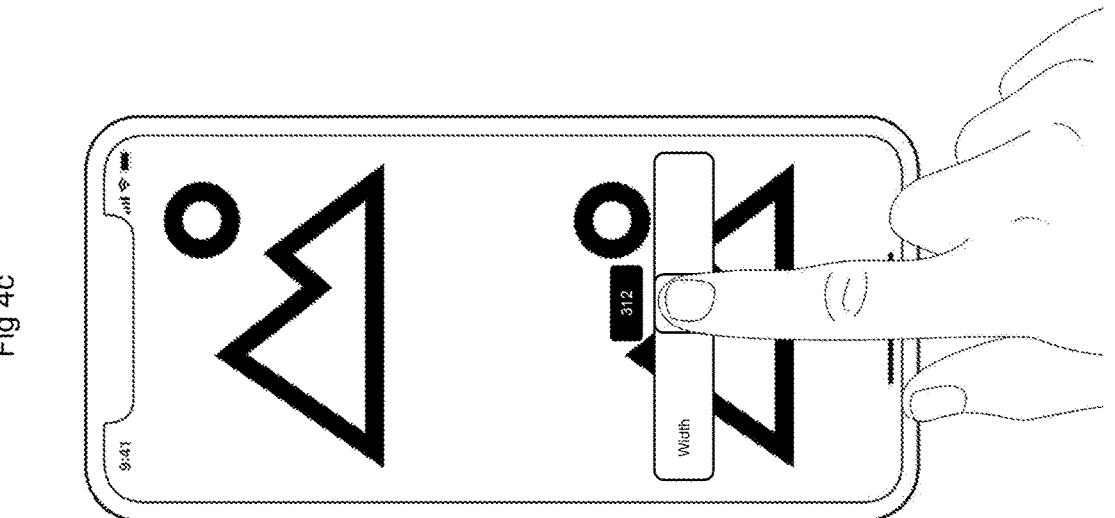
Fig 4b
Fig 4a
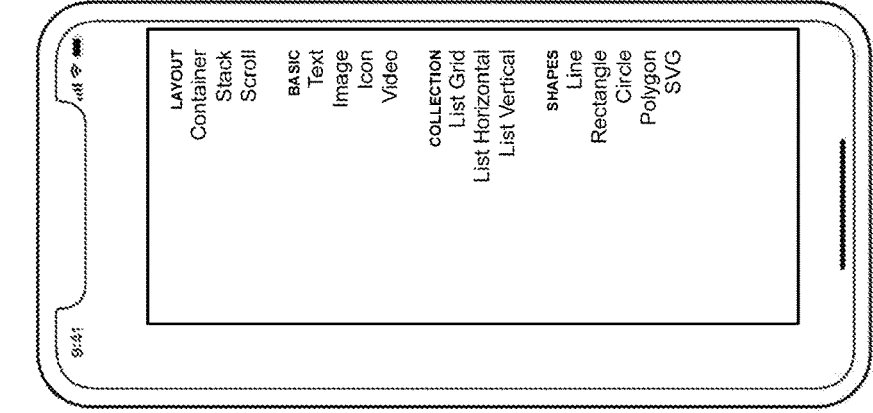

Fig 6d (action of finger is swiping upward)

(action of finger is panning downward)

SYSTEM FOR CREATING SOFTWARE PROGRAMS USING A GESTURE-BASED INTERFACE

TECHNICAL FIELD

The present invention generally relates to a system for creating programs, and specifically to a system for creating mobile apps.

BACKGROUND

Conventional program design systems are complex. In conventional systems, mobile application ("app") design is performed on a desktop or laptop computer with a keyboard, mouse, and/or trackpad and involves multiple distinct phases. Each phase, whether design, coding, collaboration, and testing suffers from problems.

Design tools require designers to work outside of the environment for which they are designing. Current design programs are still rooted in traditional graphic design software, many of which do not give a direct connection to the end medium being created for. Art boards, prototypes, simulations, and other known methods are used to get "close to the real thing." However, the actual implementation of the design—which is typically performed by a coder—is the first time the designer can actually experience "the real thing" on the device the end user will experience it on (a mobile phone).

Coding tools fare no better. The simple fact that familiarity with code is necessary for this process, either to generate or modify computer-generated code, leaves a high barrier. Coders also must continually learn new languages and tools to keep up with the latest trends and functionality.

Collaboration through design and coding also leaves much to be desired. Exchanged screenshots, screen mirroring, and screen recording lead to changes outside of the development environment that need to be incorporated into the product. Since additional complexities are involved once design-to-code-conversion is complete, design iteration is a costly and time-consuming process.

Moreover, testing is complex in conventional systems. Since designers cannot experience their work exactly like a user will until it is coded, issues can develop in later stages of the project that could have been prevented had there been a way to properly experience and test the designs in their native environment.

In addition, working on a mobile device fundamentally differs from working on a computer with a keyboard and mouse. For example, a user's thumbs or menu buttons meant to be actuated thereby can obscure large portions of the screen. In addition, mobile devices are meant to be held in a users' hands, so providing a solution that allows a user to adjust how the interact with a device is important. Accordingly, designing systems to be run on mobile devices is fundamentally different than designing systems to be run on desktop computers.

These and other problems whose solutions appear below lead to the present invention.

SUMMARY

An object of the invention is to provide a system for creating programs, specifically mobile apps.

It is a further object of the invention for the system to run in the native environment for which it creates programs.

It is a further object of the invention to design and build mobile products and apps in the native environment on which they will run.

It is a further object of the invention to allow a designer to experience the design in the native environment/device while it is being built.

It is a further object of the invention to provide a simple and functional user interface for the system.

It is a further object of the invention to iterate designs quickly and easily.

It is a further object of the invention that the system require no computer coding from its users.

In one aspect of the invention, to allow adjustments of details, including type, color, icons, borders, effects, and spacing.

It is a further object of the invention to allow collaboration, including by tracking design history and synchronizing changes between collaborators.

It is a further object of the invention to allow real-time collaboration and messaging.

In another aspect of the invention to provide a software library for inclusion in the mobile products and apps.

In another aspect of the invention to provide map integration and custom augmented reality integration.

It is a further object of the invention to provide the ability to export low fidelity wire frame outputs and source code.

In one aspect of the invention, a system for creating programs with gestures is provided with a touch computer having a touch display, a plurality of actions preloaded on said touch computer for execution by said touch computer when triggered, a trigger received by said touch computer, software executing on said touch computer for associating said trigger with a corresponding one of said plurality of actions, text received by said software, said text combinable with the triggers by said software into a program, a plurality of elements and operations components available to said touch computer for inclusion in the program, software executing on said touch computer for displaying a menu with a section for associating a gesture received by said touch display with a property of at least one element, wherein the gesture is a horizontal movement of the section relative to the touch display, a central computer in communication with said touch computer, and said central computer connected to the Internet to make the program available to authorized users.

In another aspect of the invention, a system for creating programs with gestures is provided having a touch computer, a plurality of actions preloaded on said touch computer for execution by said touch computer when triggered, a trigger received by said touch computer, software executing on said touch computer for associating said trigger with a corresponding one of said plurality of actions, text received by said software, said text combinable with the triggers by said software into a program, a central computer in communication with said touch computer, and said central computer connected to the Internet to make the program available to authorized users.

In another aspect of the invention, a system for creating programs with gestures is provided having a touch computer, actions preloaded on said touch computer for execution by said touch computer when triggered, a menu of a plurality of touch gestures displayed by said touch computer, a user gesture received by said touch computer via said menu, software executing on said touch computer for associating said user gesture as a trigger for a corresponding action, said software also for removing unselected items from said menu display upon receipt of said user gesture specifying one of said menu items, and text received by said software, said text combinable with the triggers by said software into a program stored on said touch computer.

In another aspect of the invention, a system for creating programs with gestures is provided having first and second touch computers, actions preloaded on said touch computers for execution by at least one of the touch computer when triggered, a trigger received by said first touch computer to associate a user gesture with a preloaded action on said touch computers, user text received by said first touch computer, software executing on said first touch computer for associating said triggers with said user text to create a program capable of executing on said first touch computer, said program loaded onto said second touch computer, and an end-user gesture received on said second touch computer to operate said program.

Other embodiments of the system are described in detail below and are also part of the present teachings.

For a better understanding of the present embodiments, together with other and further aspects thereof, reference is made to the accompanying drawings and detailed description, and its scope will be pointed out in the appended claims.

BRIEF DESCRIPTION OF THE DRAWINGS

FIG. 1 is a schematic diagram of the presently disclosed system.

FIG. 2 is a schematic diagram of the presently disclosed system.

FIG. 3 is a schematic diagram of the presently disclosed system.

FIGS. 4a-4f are schematic diagrams of a user interface of the presently disclosed system.

FIGS. 6a-6e are schematic diagrams of a user interface of the presently disclosed system.

DETAILED DESCRIPTION

Figure 4F:
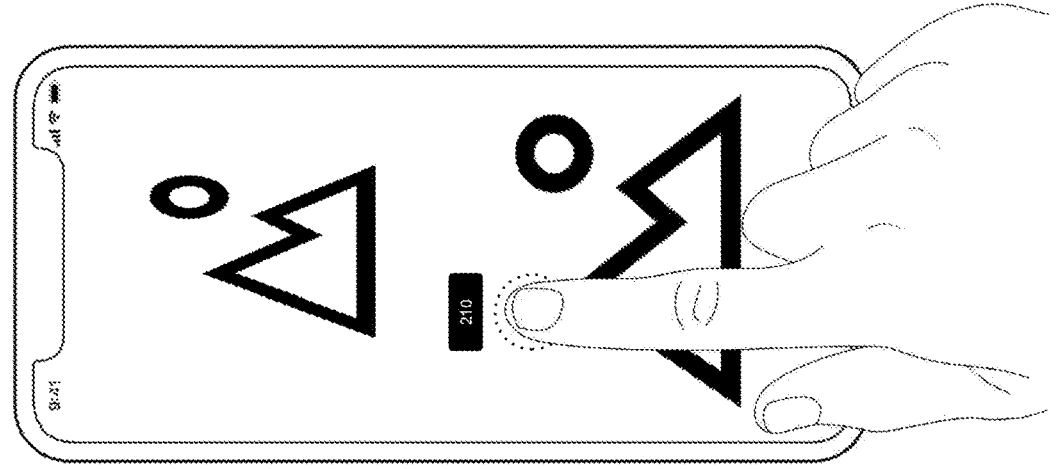

Referring to FIG. 1, the present disclosure describes a system 10 for creating programs.

The system 10 includes a user touch computer 1. The user touch computer 1 may a mobile phone, smartphone, tablet, or handheld device. The user touch computer 1 uses touches as input. The user touch computer 1 may run the iOS or iPadOS (Apple) or Android (Google) operating systems.

The user touch computer 1 has authoring software 11, the operation of which is described below. The user touch computer may receive input from a user(s) 2, including gestures 21, text 22, and data 23, which may be provided to the authoring software 11. Gestures 21 may include tap, pan, drag, flick, wipe, double tap, pinch, touch and hold, shake and rotate, among others. Text 22 may include basic, rich, or formatted text. Data 23 as input may include an electronic document, data stream, or other electronic means of providing information. Data 23 may be text, images, video, sound, multimedia and any other type of data. Data 23 may reflect information to be displayed in the user app 15, such as weather information, news, updates, emails, messages, and other information.

Actions 12 are native to the type of user touch computer 1. Actions 12 associate a user input with a desired component. For example, pinch-to-zoom is a common action based on a pinch gesture. Other actions 12 include tap-to-select, drag-and-drop, flick-to-scroll, swipe-to-scroll, double-tap-to-zoom, touch and hold-to-magnify, shake-to-undo, and rotate-to-rotate.

The user touch computer 1 may be in data communication with a third party source 3. Third party source 3 may provide information to the system 10, including data 23.

The user touch computer 1 may also be in data communication with database 4. The database 4 may provide a library 42 of available elements and components to the user touch computer 1. Elements include layout views, basic elements, collections, and shapes. Layout views include containers, stacks, and scrolls. Basic elements including text, images, icons, videos, and other multimedia. Collections include list grids, list scroll horizontals, list scroll verticals. Shapes include lines, circles, triangles, rectangles, squares, etc. The database 4 may also provide available a library 42 to the user touch computer 1. The library 42 may provide pre-defined components to the user app 15, including alerts, augmented reality, badges, buttons, cards, carousels, charts, header bars, input, lists, loaders, maps, pagination, panels, progress bars, tab bars, and others. Components may include an element so as to be displayed on-screen. Library 42 may use data 23 to provide updates and information via elements or components.

In some embodiments, database 4 may be internal or native to user touch computer 1. For instance, the operating system of user touch computer 1 may be preloaded with elements or components.

The user touch computer 1 may also be in data communication with an external device 5. The external device 5 may include any device capable of storing electronic files, including a computer, laptop, smartphone. The external device 5 may also include any cloud storage system, including those provided by Dropbox, Microsoft (OneDrive), Apple (iCloud), etc.

Authoring software 11 on user touch computer 1 displays a user interface for generating programs, including apps and/or webpages (collectively, the user app 15). The authoring software 11 may receive input for generating the program, which may include gestures 21, text 22, and data 23.

Authoring software 11 allows the placement and moving of elements in the user app 15. Elements include layout views, basic elements, collections, and shapes. Layout views include containers, stacks, and scrolls. Basic elements including text, images, icons, videos, and other multimedia. Collections include list grids, list scroll horizontals, list scroll verticals. Shapes include lines, circles, triangles, rectangles, squares, etc.

Authoring software 11 also allows for the provision of properties to elements via a menu. (See FIG. 4a.) For example, when an image element is selected, authoring software 11 may show a menu of image element properties for provision or modification. (See FIG. 4b.) As another example, properties such as picture selection, content mode (aspect fill, aspect fit, scale to fill), width, height, scale, etc. may be shown with a slider. (See FIG. 4b.) When a gesture 21 indicative of a selection of one of the properties/slides is input, other menu items are hidden such that the focus is on the selected property/slider, a measurement thereof, and the element. (See FIG. 4c.)

As the gesture 21 moves the slider, the image may be modified in real time to show the effect of the modification. (See FIGS. 4d, 4e.) For example, when the authoring software 11 receives a gesture 21 selecting the width slider and dragging along a horizontal axis, the image may shrink, and a measurement of the width may be shown. (See FIG. 4e.) Other elements in the app may be repositioned in real-time based on the change in width. (See FIG. 4e.) In this way, the authoring software 11 displays the complete effect of the change on the entire design.

The user may also drag the slider in another direction, such as vertically, to reposition the slider. (See FIG. 4d.) This allows a different portion of the screen to be visible, allowing better review of the design. Alternatively, repositioning the slider may achieve a more comfortable working situation.

Horizontal and vertical movement are discussed for illustrative purposes only, as any directions and/or axis may be used with the present invention.

Figure 4E:
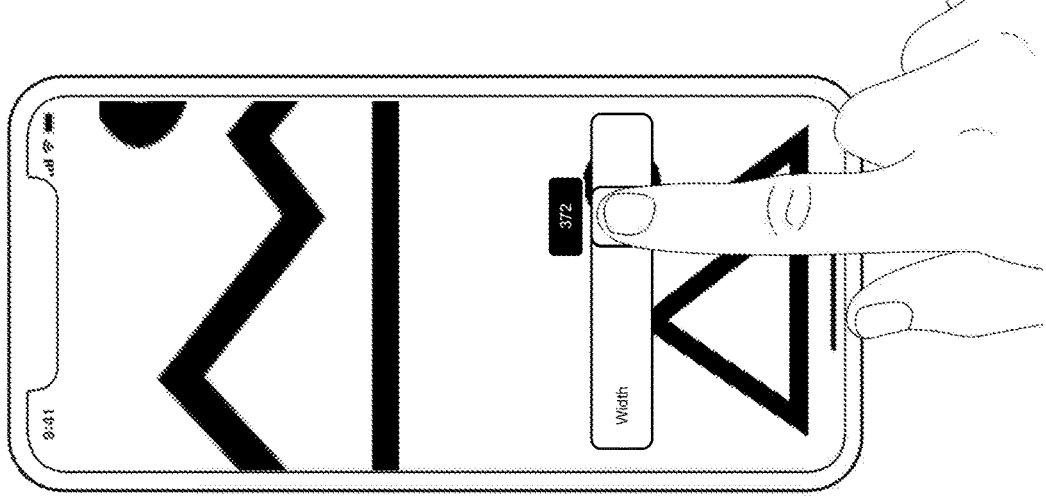
Figure 4D:
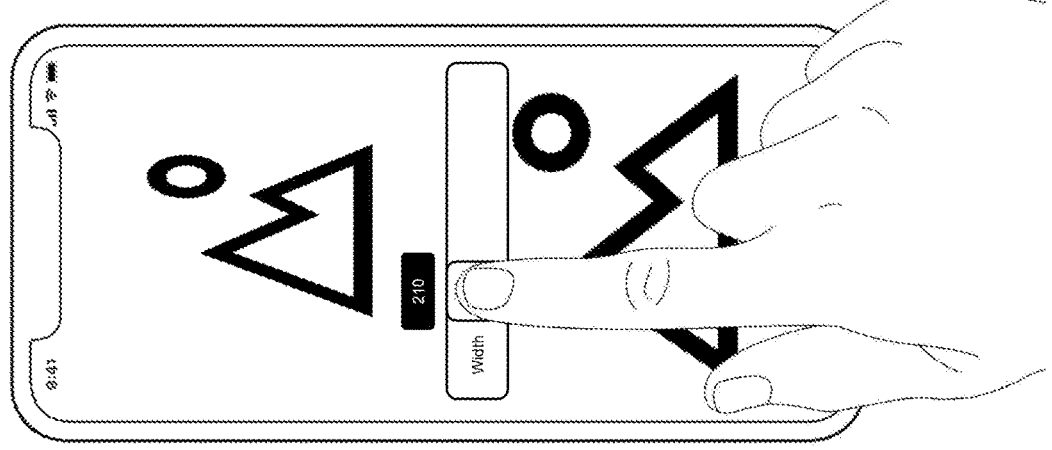

In addition, though FIGS. 4b-4d show a slider, such a design is not necessary to achieve the present invention. Other shapes may be used for the slider. As shown in FIG. 4f, upon selection of the slider in FIG. 4b, the horizontal bar and indicator may disappear. The location of the user's touch in FIG. 4f is shown in dashed lines for clarity, but does not appear on-screen. A numerical representation of the property may optionally be visible, as shown in FIG. 4f.

Furthermore, FIG. 4b shows a nine-circle grid that allows selection of properties.

As another example, when a list grid collection element is selected, a gesture 21 may select a slider indicative of the number of columns for the list grid. The slider may be a bar. As gestures 21 adjust the slider, the authoring software 11 may rearrange list grid entries in real-time to comply with the selected number of columns.

As another example, the menu may allow scrolling through available selectable elements via a slider. The slider may be a bar. For example, if a container elements includes an image and text, a slider may cycle through the container, image and text to allow for selection and modification of properties.

Gestures 21 may also be used to add an action 12 to the element 41. For example, a gesture 21 tapping a menu item may indicate associate a pinch-to-zoom action with an image element.

Library 42 may also include components. Components may have a pre-defined element associated therewith. A menu may display the library 42, which may include alerts, augmented reality, badges, buttons, cards, carousels, charts, header bars, input, lists, loaders, maps, pagination, panels, progress bars, and tab bars, among others.

Figure 5C:
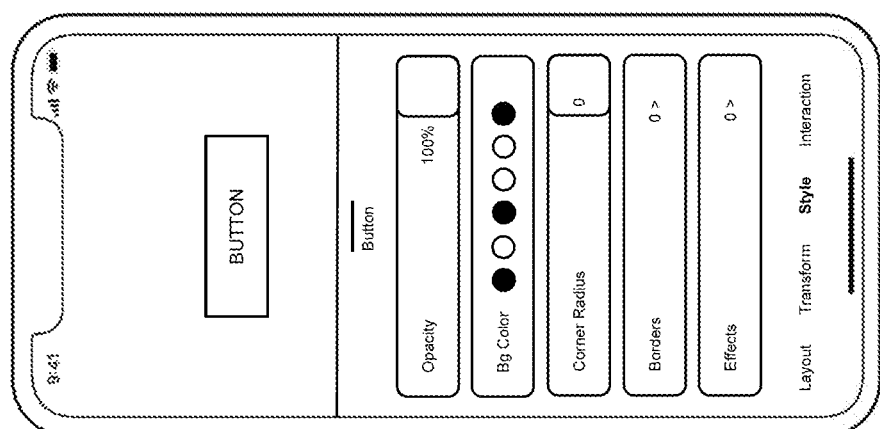
FIGS. 5a-5f are schematic diagrams of a user interface of the presently disclosed system.
Figure 5B:
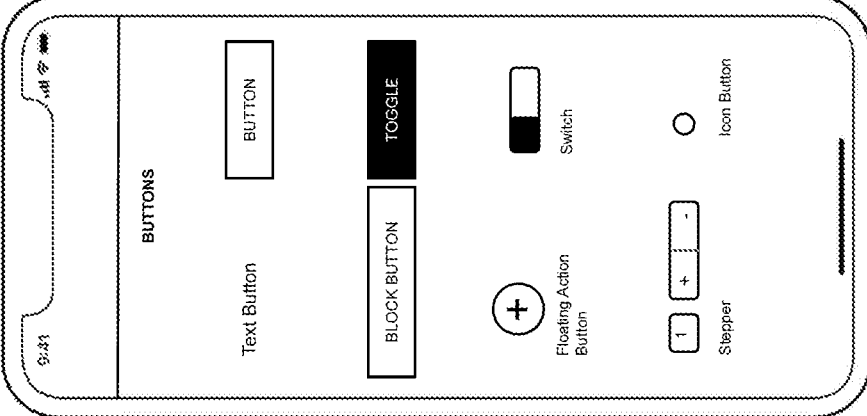
Figure 5A:
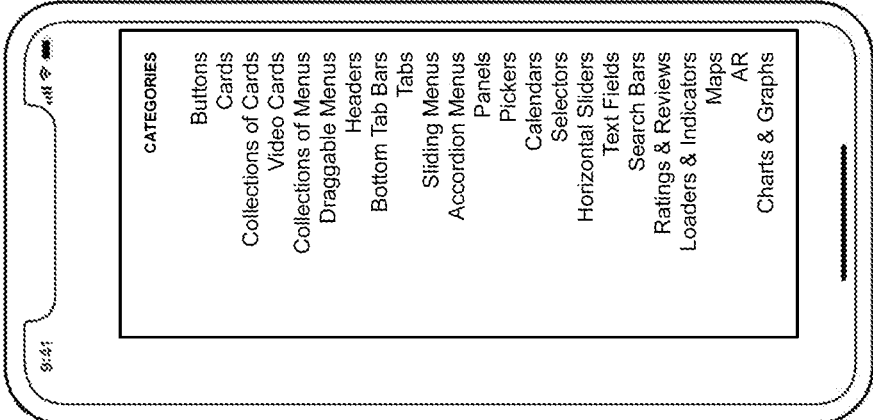
Figures 5D, 5E, 5F:
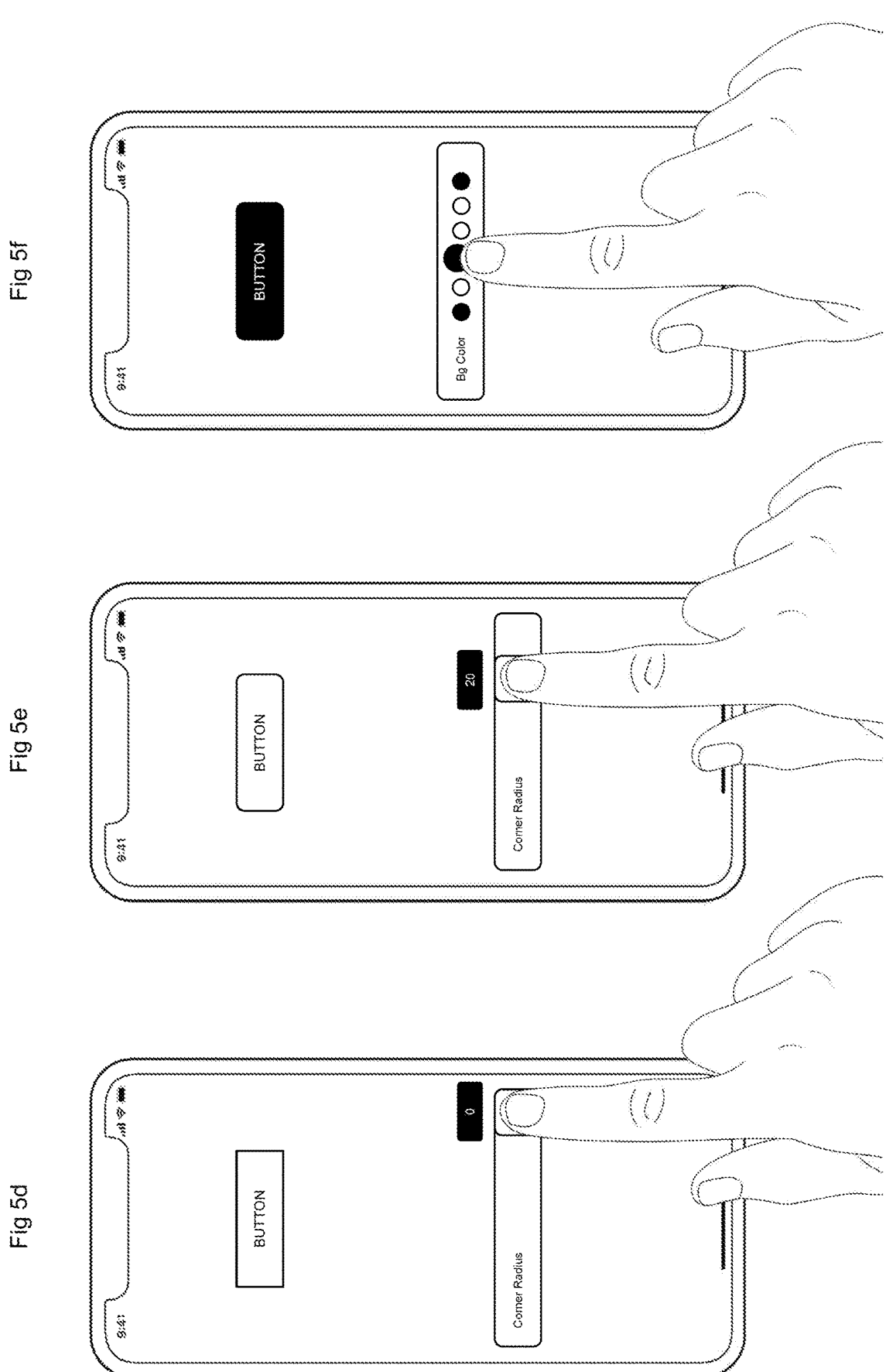

The authoring software 11 may receive a gestures 21 to customize the appearance and/or functionality of the component. (See FIG. 5b.) For example, upon selecting a button, a menu having sliders for button properties may be shown, including color, shape, size, padding, margin, and placement of the button. (See FIG. 5c.) The sliders may be bars. Authoring software 11 receives a gesture 21 indicative of a selection of a sliders, and hides other menu options so the button and measurements are shown. (See FIGS. 5d, 5e, 5f.) As the gesture 21 moves the slider, the button may be modified in real time to show the effect. (See FIGS. 5d, 5e, 5f (different colors may be shown in the circles for FIG. 5f allowing a user to select a background color for the button).) For example, when a user selects the button shape slider and drags it to the left, the edges of the button may become more square. (See FIGS. 5d, 5e.) A rectangle and circles defining the shape of the button may be shown with corresponding measurements. (See FIGS. 5d, 5e.) The user can drag the slider in another direction such as vertically to reposition the slider to view a different portion of the screen, or achieve a more comfortable working situation.

Figures 6A, 6B, 6C:
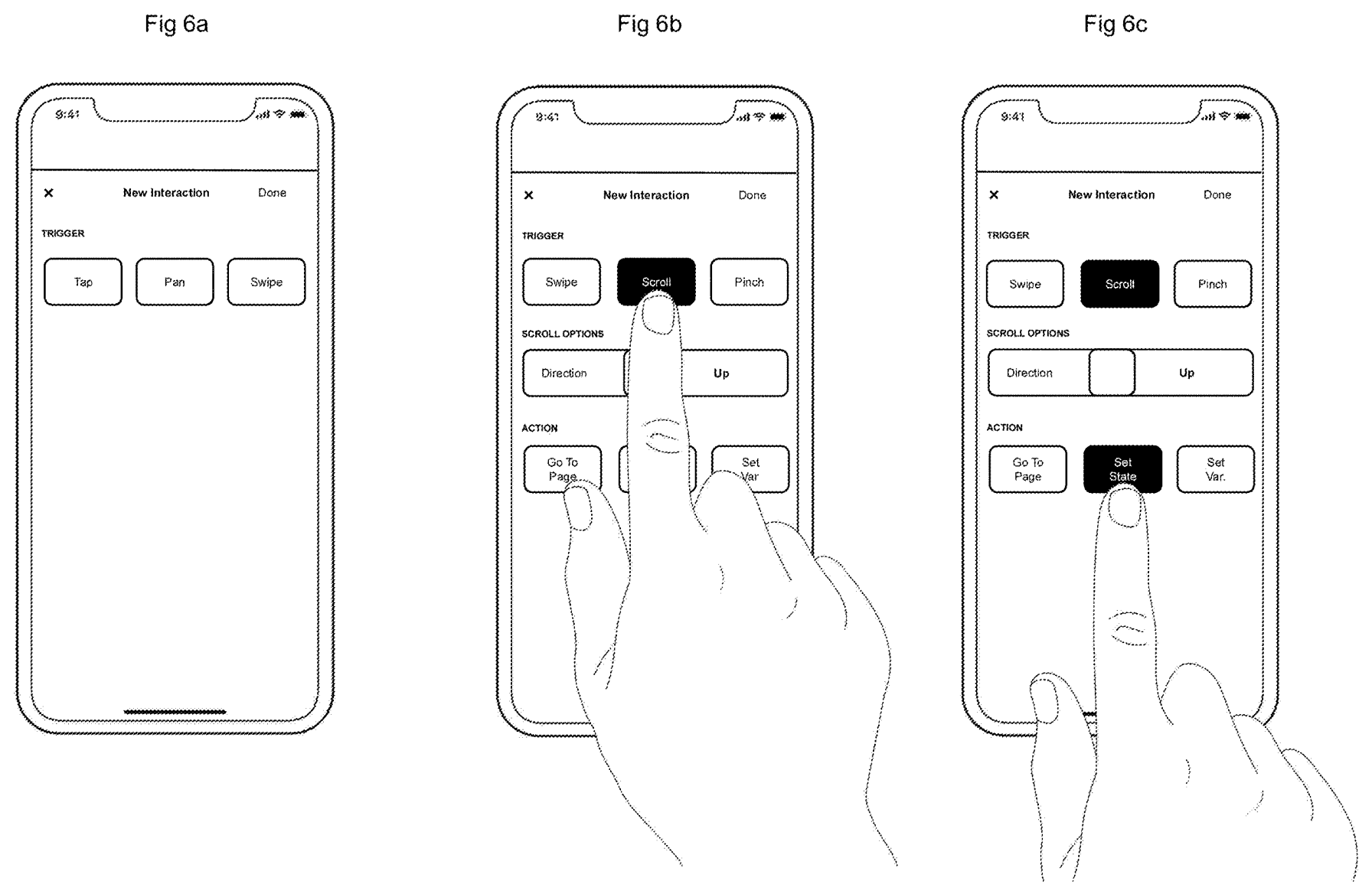
Figures 6D, 6E:
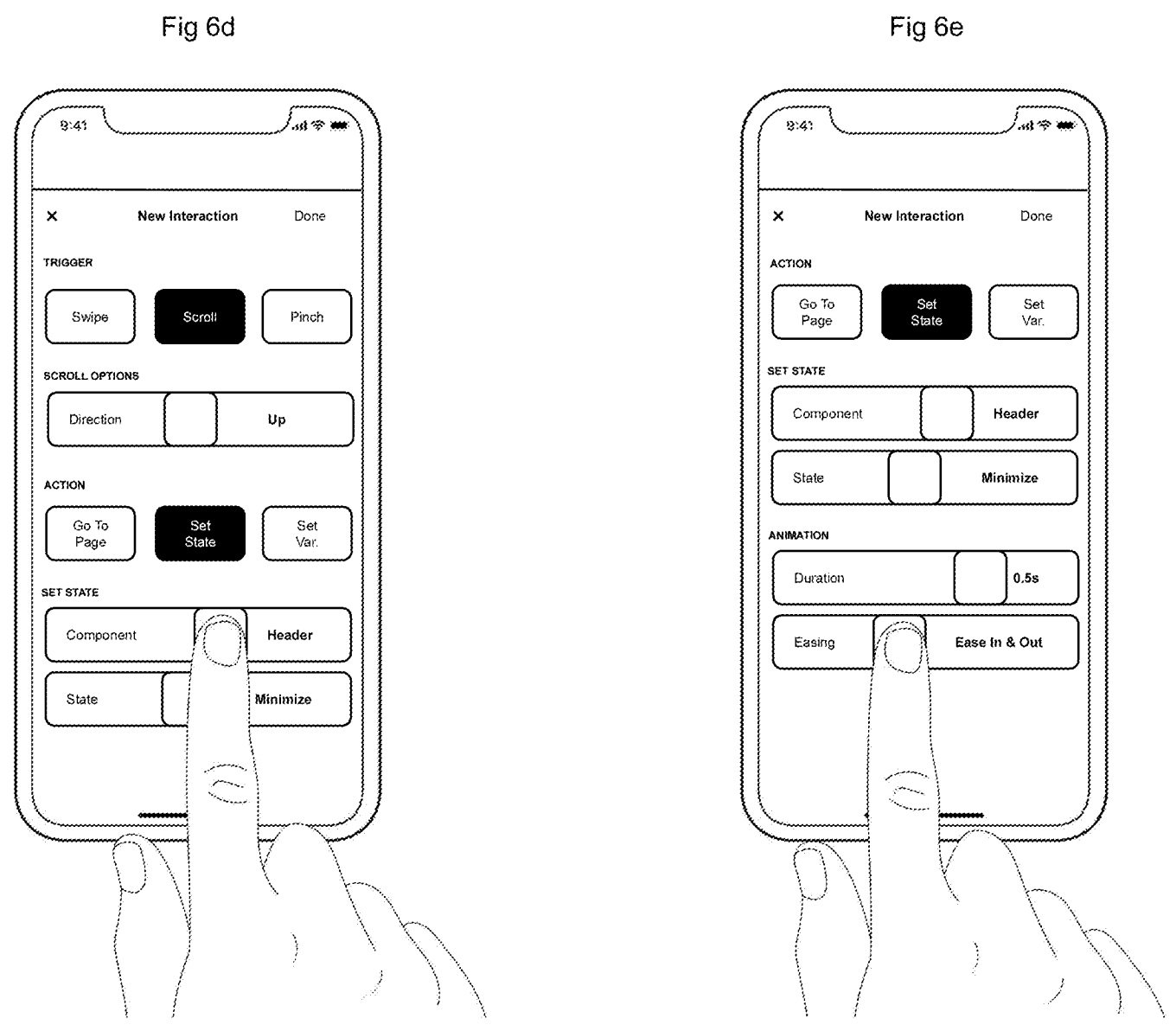
Figures 7A, 7B:
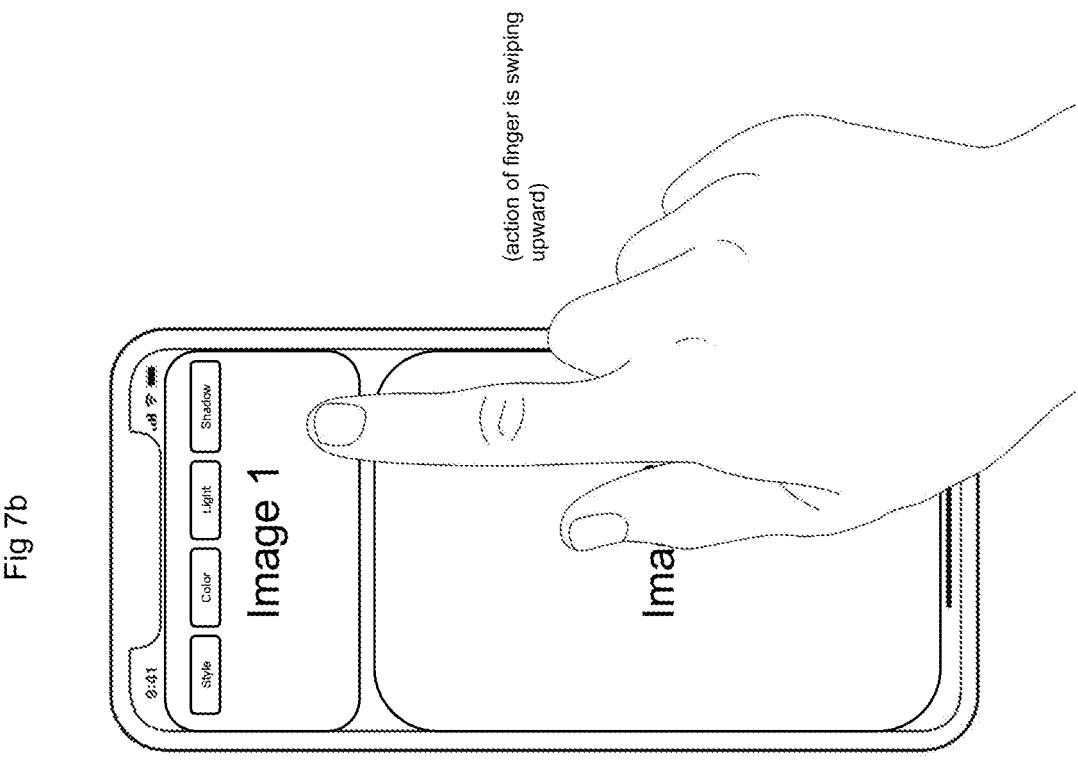
FIGS. 7a-7b are schematic diagrams of a user interface of the presently disclosed system.

Authoring software 11 may also use gestures 21 to define additional actions 12. The authoring software 11 may show a menu that allows selection a type of gesture, such as tap, swipe, pan, scroll, pinch, etc. (See FIG. 6a.) Based on the gesture selected, the menu will dynamically update to present additional options. For example, if "scroll" is selected, gestures 21 may be used to select that upon the initiation of a scroll in the user app 15, a header may be minimized with an animation. (See FIGS. 6b-6e.) Once defined, the new action 12 will become immediately available in application software 11. (See FIGS. 7a and 7b.)

Figure 8B:
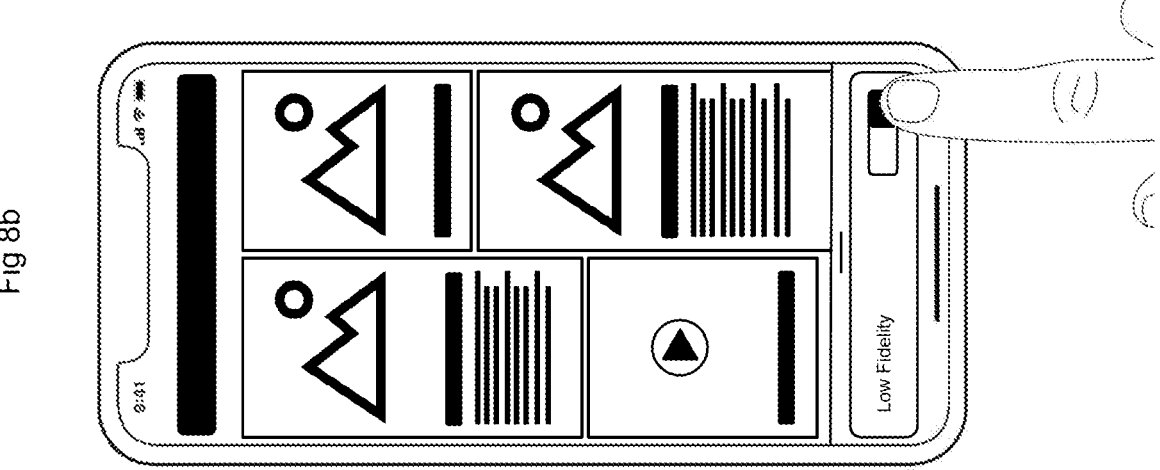
FIGS. 8a-8b are schematic diagrams of a user interface of the presently disclosed system.
Figure 8A:
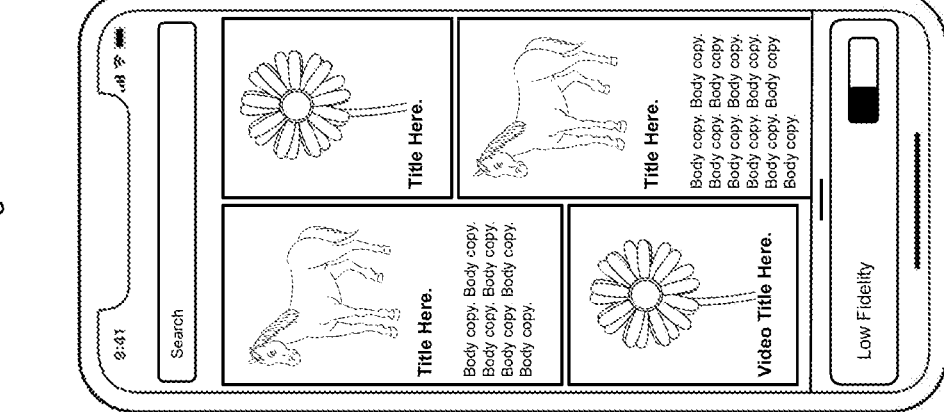

Application software 11 is configured to output the user app 15, source code 13, and a wire frame 14 to external device 5. The user app 15 is designed to be executable on the same type of user touch computer as user touch computer 1. The user app 15 may also be designed to be executable on a different type of smartphone, mobile phone, tablet, or other handheld device. Alternatively, application software 11 may output a progressive web app. The source code 13 may be loaded in another program for modification and editing. The wire frame 14, provides a conceptual view of the elements and components of the user app 15. (See FIGS. 8a, 8b.)

As shown in FIG. 2, the user touch computer 1 may also be in data communication with a central app computer 6. The central app computer 6 may be a processor, remote computer, computer server, network, desktop, laptop, or any other computing resource. The central app computer 6 may also be in communication with the internet 7. The central app computer 6 also may be in communication with an app database 61, which stores and retrieves data for the central app computer 6. The central app computer 6 and app database 61 may be a commercial app store, such as the Apple App Store, Google Play Store, or Amazon Appstore.

Authorized user touch computer 8 may be in data communication with the internet 7. The authorized user touch computer 8 may be a mobile phone, smartphone, tablet, or handheld device. Authorized user touch computer 8 is advantageously of the same type as the user touch computer 1. For instance, both may be the same type of smartphone. Alternatively, authorized user touch computer 8 may be of a different type of smartphone, mobile phone, tablet, or other handheld device. The authorized user touch computer 8 may receive input from authorized user(s) 81, including gestures 82.

If the user app 15 is to be released to authorized users, the central app computer 6 receives user app 15 from the user touch computer 1. The central app computer 6 may store the user app 15 on the app database 61. the central app computer 6 may make the user app 15 available via the internet 7. The central app computer 6 may allow authorized users may download the user app 15 via authorized user touch computer 8. When run, user app 15 will receive gestures 82, which allow for display and execution of the elements, components, and actions 12 in the user app 15.

As shown in FIG. 3, the user touch computer 1 may be in data communication with a collaboration touch computer 9. The collaboration touch computer 9 may be a mobile phone, smartphone, tablet, or handheld device. The collaboration touch computer 9 may be of the same type as the user touch computer 1. For instance, both may be the same type of smartphone. Alternatively, collaboration touch computer 9 may be of a different type of smartphone, mobile phone, tablet, or other handheld device. The collaboration touch computer 9 also has authoring software 11. The collaboration touch computer 9 may receive input including gestures, text, or data 92.

User touch computer 1 may make the user app 15, source code 13 and/or wire frame 14 available to collaboration users via collaboration touch computer 9. Collaboration touch computer 9 may run authoring software 11 to make changes to the user app 15. For example, authoring software 11 may be used to modify the design, appearance, and/or operation of user app 15. A separate version of the user app 15, source code 13, and/or wire frame 14 may be saved so that changes may be reverted if necessary. The separate version may be saved locally, in a manner available to the user touch computer 1, or via the central app computer 6. Central app computer 6 may maintain a list of collaborators to whom the separate version is available.

Figures 9A, 9B:
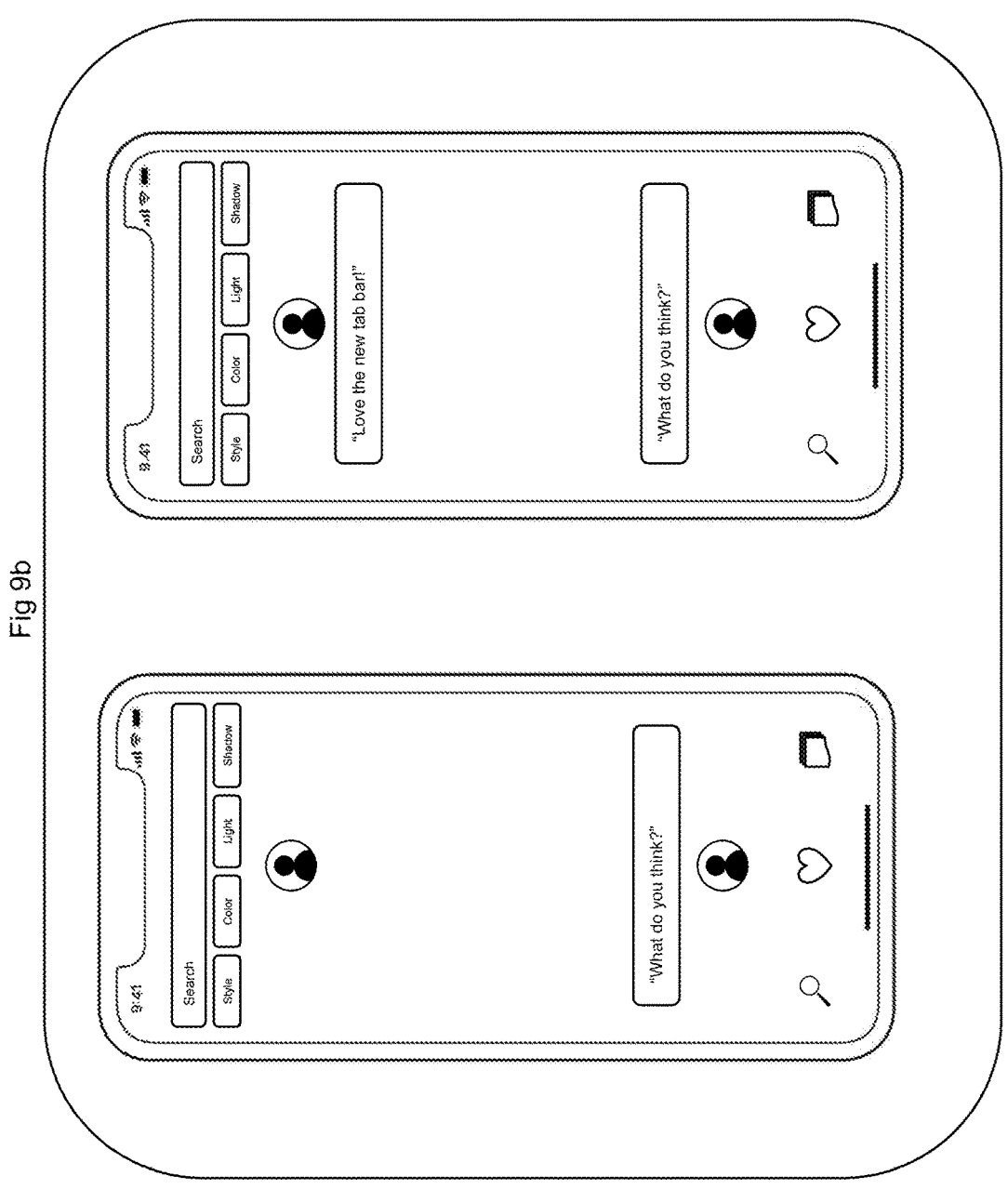
FIGS. 9a-9b are schematic diagrams of a user interface of the presently disclosed system.

The authoring software 11 may allow a user touch computer 1 and collaboration touch computer 9 to simultaneously collaborate on the same version. For instance, the user touch computer 1 may be used to modify a header while the collaboration touch computer 9 may be modifying a row of icons across the bottom. (See FIGS. 9*a*, 9*b*.) Messages may be exchanged between user touch computer 1 and touch collaboration touch computer 9 for real-time communication. (See FIG. 9*b*.)

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for creating programs with gestures, comprising:

a touch computer having a touch display;

a plurality of actions preloaded on said touch computer for execution by said touch computer when triggered;

a trigger received by said touch computer;

software executing on said touch computer for associating said trigger with a corresponding one of said plurality of actions;

text received by said software, said text combinable with the triggers by said software into a program;

a plurality of elements and components available to said touch computer for inclusion in the program;

software executing on said touch computer for displaying a menu with a section for associating a gesture received by said touch display with a property of at least one element;

the menu being superimposed on the program being created on the touch display;

wherein the gesture is initiated by a singular press on the touch display, the gesture is comprised of a continuous series of movements of the section, and the gesture is terminated with the release of the singular press on the touch display, wherein contact with the touch display is maintained during an entirety of the gesture;

a first axis extending horizontally across the touch display, wherein portions of the gesture along the first axis change the property of the element;

a second axis extending vertically across the touch display, wherein portions of the gesture along the second axis change the location of the section;

wherein the gesture follows along a vector comprised of a combination of the first axis and the second axis, wherein changes to the property of the element and location of the section follow along the vector in proportion to the combination of the first and second axis;

wherein changes to the property of the element and corresponding changes to other elements are displayed in real-time in the program in response to the first movement of the gesture;

software executing on said touch computer for repositioning the section based on the second movement of the gesture;

a central computer in communication with said touch computer;

said central computer connected to the Internet to make the program available to authorized users.

2. The system of claim 1, wherein the section is a first section and the menu includes at least one additional section; wherein selection of the first section makes all other additional sections disappear from the menu.

3. The system of claim 2, wherein when the first section is no longer selected, the at least one additional section reappears.

4. The system of claim 2, further comprising software executing on said touch computer for displaying a menu with a section for associating a gesture received by said touch display with a property of at least one component.

5. The system of claim 2, wherein the first section is a slider and at least one additional section is a slider, and wherein the first section and the at least one additional section are adjacent to one another.

6. The system of claim 5, wherein the first section is above the at least one additional section.

7. The system of claim 1, wherein a numerical representation of the property is displayed.

8. The system of claim 1, wherein the section is a slider.

9. The system of claim 1, wherein the program is adapted to be run on the touch computer.

10. The system of claim 1, wherein the gesture received by said touch computer is a sliding gesture.

11. The system of claim 1, wherein the program is provided to a second touch computer.

12. The system of claim 11, wherein the second touch computer modifies the program.

13. The system of claim 12, wherein the second touch computer sends the modified program to the touch computer.

14. The system of claim 12, wherein the second touch computer is different than the first touch computer.

* * * * *